(12) United States Patent
Mai

(10) Patent No.: US 10,773,436 B2
(45) Date of Patent: Sep. 15, 2020

(54) INJECTION MOLDING APPARATUSES

(71) Applicant: Husky Injection Molding Systems Ltd., Bolton (CA)

(72) Inventor: Arnold Heinz Mai, Irrel (DE)

(73) Assignee: HUSKY INJECTION MOLDING SYSTEMS LTD., Bolton, Ontario (CA)

( * ) Notice: Subject to any disclaimer, the term of this patent is extended or adjusted under 35 U.S.C. 154(b) by 151 days.

(21) Appl. No.: 15/737,508

(22) PCT Filed: Jun. 1, 2016

(86) PCT No.: PCT/CA2016/050616
§ 371 (c)(1),
(2) Date: Dec. 18, 2017

(87) PCT Pub. No.: WO2017/004697
PCT Pub. Date: Jan. 12, 2017

(65) Prior Publication Data
US 2018/0178427 A1 Jun. 28, 2018

Related U.S. Application Data

(60) Provisional application No. 62/189,827, filed on Jul. 8, 2015.

(51) Int. Cl.
*B29C 45/27* (2006.01)
*B29C 45/26* (2006.01)
*B29L 31/56* (2006.01)

(52) U.S. Cl.
CPC ...... *B29C 45/2711* (2013.01); *B29C 45/2675* (2013.01); *B29C 2045/2677* (2013.01); *B29L 2031/565* (2013.01)

(58) Field of Classification Search
CPC ............ B29C 45/2711; B29C 45/2675; B29C 2045/2677; B29L 2031/565
See application file for complete search history.

(56) References Cited

U.S. PATENT DOCUMENTS 3,677,682 A 7/1972 Putkowski
5,262,116 A 11/1993 Von Holdt, Sr.
(Continued)

FOREIGN PATENT DOCUMENTS

CN 1824485 A 8/2006
DE 10037739 A1 2/2002
(Continued)

OTHER PUBLICATIONS

PCT International Search Report, Zhang, Penfei, dated Jul. 19, 2016, 3 pages.

*Primary Examiner* — Robert J Grun

(57) ABSTRACT

In one embodiment, a gate insert includes an injection gate body having front and rear opposite sides and an aperture extending through the injection gate body between an injection gate outlet on the front side and an opening on the rear side. The injection gate body is connectable to and disconnectable from a gate pad in a cavity plate from a front side of the gate pad and from a front side of the cavity plate. In another embodiment, a cavity flange includes a molding body defining at least a portion of a molding cavity shaped to mold a shell of a closure for a container. The molding body is connectable to and disconnectable from a gate insert in a cavity plate from a front side of the gate insert and from a front side of the cavity plate. Other apparatuses are disclosed.

17 Claims, 12 Drawing Sheets

(56) References Cited

U.S. PATENT DOCUMENTS

| | | | |
|---|---|---|---|
| 6,030,202 | A | 2/2000 | Gellert |
| 6,390,800 | B1 | 5/2002 | Brown et al. |
| 6,450,797 | B1 | 9/2002 | Joseph |
| 6,569,370 | B1 | 5/2003 | Amin et al. |
| 7,306,454 | B2 | 12/2007 | Babin et al. |
| 7,458,803 | B2 | 12/2008 | Bouti |
| 7,566,216 | B2 * | 7/2009 | Kmoch ............... B29C 45/2711 425/549 |
| 7,628,605 | B2 | 12/2009 | Mai et al. |
| 8,535,045 | B2 | 9/2013 | McCready |
| 9,272,453 | B1 | 3/2016 | Keir et al. |
| 2008/0268089 | A1 | 10/2008 | Kmoch et al. |
| 2009/0304848 | A1 | 12/2009 | Neter et al. |
| 2012/0135102 | A1 | 5/2012 | Glaesener |

FOREIGN PATENT DOCUMENTS

| | | |
|---|---|---|
| EP | 0374549 B1 | 3/1995 |
| EP | 1424183 A2 | 6/2004 |
| KR | 20120135587 A | 12/2012 |
| WO | 2011130847 A1 | 10/2011 |

* cited by examiner

INJECTION MOLDING APPARATUSES

FIELD

This disclosure relates generally to injection molding.

RELATED ART

Injection molding apparatuses may include a hot runner assembly including injection nozzles that inject melted plastic through injection gates in a cavity plate and into molding cavities to form solid plastic objects defined by the molding cavities. The injection nozzles may be heated to facilitate injection of the melted plastic, whereas the molding cavities may be cooled to facilitate solidification of the melted plastic in the molding cavities.

In some injection molding apparatuses, the molding cavities are defined at least in part by gate inserts that are mounted to the cavity plate from the same side of the cavity plate that receives the injection nozzles. In such injection molding apparatuses, removing the gate inserts or cleaning the gate inserts requires detaching the cavity plate from the hot runner assembly, for example by "latching over" the cavity plate to a movable stack assembly.

SUMMARY

According to one embodiment, there is disclosed an injection molding apparatus comprising: a first injection gate body having front and rear opposite sides and a first aperture extending through the first injection gate body between an injection gate outlet on the front side of the first injection gate body and an opening on the rear side of the first injection gate body; and a second injection gate body having front and rear opposite sides and a second aperture extending through the second injection gate body between an opening on the front side of the second injection gate body and an opening on the rear side of the second injection gate body, the second injection gate body comprising an inner sealing surface defining at least a portion of the second aperture and complementary to an outer sealing surface portion of an injection nozzle such that, when a portion of the injection nozzle is received in the second aperture, the outer sealing surface portion of the injection nozzle contacts the inner sealing surface of the second injection gate body to form a seal between the outer sealing surface portion of the injection nozzle and the inner sealing surface of the second injection gate body, wherein the first injection gate body is connectable to and disconnectable from the second injection gate body from the front side of the second injection gate body such that, when the rear side of the first injection gate body is connected in a connected position to the front side of the second injection gate body, the first aperture is adjacent the second aperture to permit the first aperture to receive at least a front portion of a nozzle tip of the injection nozzle with at least one nozzle outlet of the nozzle tip positioned to inject fluid through the injection gate outlet when the portion of the injection nozzle is received in the second aperture.

In some embodiments, the apparatus further comprises a molding body connectable to and disconnectable from the first injection gate body from the front side of the first injection gate body wherein, when the molding body is connected in a connected position to the front side of the first injection gate body, the molding body defines at least a portion of a molding cavity.

In some embodiments, when the molding body is connected in the connected position to the front side of the first injection gate body, the molding body and a molding surface on the front side of the first injection gate body define at least a portion of the molding cavity.

In some embodiments, the first injection gate body is a gate insert that defines a top panel of a closure for a container, and wherein the molding body is a cavity flange that defines a shell of the closure.

In some embodiments, the second injection gate body is a gate pad that is configured to be received in a cavity plate of a cavity assembly.

In some embodiments, the second injection gate body defines a recess sized to receive at least a portion of the first injection gate body, and wherein the gate insert is connectable to the gate pad from the front side of the gate pad when the at least a portion of the gate insert is inserted in the recess.

In some embodiments, the second injection gate body defines a recess sized to receive at least a portion of the first injection gate body, and wherein the first injection gate body is connectable to the second injection gate body from the front side of the second injection gate body when the at least a portion of the first injection gate body is inserted in the recess.

In some embodiments, the outer sealing surface portion of the injection nozzle and the inner sealing surface of the second injection gate body are generally cylindrical.

In some embodiments, at least one of the first injection gate body and the second injection gate body defines at least one thermal insulation space between at least one surface of the first injection gate body and at least one surface of the second injection gate body that are adjacent when the first injection gate body is connected in the connected position to the front side of the second injection gate body.

In some embodiments, the first injection gate body defines a first abutment surface on the rear side of the first injection gate body and surrounding the opening on the rear side of the first injection gate body. In some embodiments, the second injection gate body defines a second abutment surface on the front side of the second injection gate body and surrounding the opening on the front side of the second injection gate body. In some embodiments, when the first injection gate body is connected in the connected position to the front side of the second injection gate body, the first abutment surface abuts the second abutment surface to form a seal between the first abutment surface and the second abutment surface, and the thermal insulation space is defined between the first abutment surface and the second abutment surface.

In some embodiments, the apparatus further comprises the injection nozzle, wherein the injection nozzle comprises a fluid conduit extending through the injection nozzle and terminating at the at least one nozzle outlet, and wherein the outer sealing surface portion surrounds a portion of the fluid conduit.

In some embodiments, when the portion of the injection nozzle is received in the second aperture, the injection nozzle is spaced apart from the first injection gate body.

According to another embodiment, there is disclosed an injection molding apparatus for use in a cavity plate assembly, the apparatus comprising: a first injection gate body having front and rear opposite sides and a first aperture extending through the first injection gate body between an injection gate outlet on the front side of the first injection gate body and an opening on the rear side of the first injection gate body; and a first molding body connectable to and disconnectable from the first injection gate body from the front side of the first injection gate body and the cavity plate assembly from a front side of the cavity plate assembly, wherein the first molding body defines at least a portion of a first molding cavity shaped to mold at least a portion of a closure for a container.

In some embodiments, the apparatus further comprises the cavity plate assembly.

In some embodiments, when the first molding body is disconnected from the front side of the first injection gate body and from the cavity plate assembly, the apparatus is free from any structure that would prevent the first injection gate body from being connectable to or disconnectable from the cavity plate assembly from the front side of the cavity plate assembly.

In some embodiments, when the first molding body is connected to the front side of the first injection gate body, the first molding body and a molding surface on the front side of the first injection gate body define at least a portion of the first molding cavity.

In some embodiments, the apparatus further comprises a second injection gate body having front and rear opposite sides and a second aperture extending through the second injection gate body between an opening on the front side of the second injection gate body and an opening on the rear side of the second injection gate body, wherein the first injection gate body is connectable to and disconnectable from the second injection gate body from the front side of the second injection gate body such that, when the rear side of the first injection gate body is connected in a connected position to the front side of the second injection gate body, the first aperture is adjacent the second aperture.

In some embodiments, the second injection gate body comprises a front surface on the front side of the second injection gate body and substantially coplanar with the molding surface on the front side of the first injection gate body when the first injection gate body is connected in the connected position to the front side of the second injection gate body.

In some embodiments, the apparatus further comprises a second molding body connectable to and disconnectable from the first injection gate body from the front side of the first injection gate body and the cavity plate assembly from the front side of the cavity plate assembly, wherein the second molding body defines at least a portion of a second molding cavity shaped to mold at least a portion of a closure, for a container, having a height different from a height of the at least a portion of the closure defined by the first molding body.

According to another embodiment, there is disclosed a gate insert comprising: an injection gate body having front and rear opposite sides and an aperture extending through the injection gate body between an injection gate outlet on the front side of the injection gate body and an opening on the rear side of the injection gate body, wherein the injection gate body is connectable to and disconnectable from a gate pad in a cavity plate from a front side of the gate pad and from a front side of the cavity plate.

In some embodiments, the injection gate body has a tapered alignment surface on the rear side of the injection gate body to facilitate aligning the injection gate body with the gate pad.

In some embodiments, the injection gate body has a molding surface on the front side of the injection gate body that defines a top panel of a closure for a container.

According to another embodiment, there is disclosed a cavity flange comprising: a molding body defining at least a portion of a molding cavity shaped to mold a shell of a closure for a container, wherein the molding body is connectable to and disconnectable from a gate insert in a cavity plate from a front side of the gate insert and from a front side of the cavity plate.

In some embodiments, the molding body has a tapered alignment surface on the rear side of the molding body to facilitate aligning the molding body with the gate insert.

Other aspects and features will become apparent to those ordinarily skilled in the art upon review of the following description of illustrative embodiments in conjunction with the accompanying figures.

DETAILED DESCRIPTION

Figure 1:
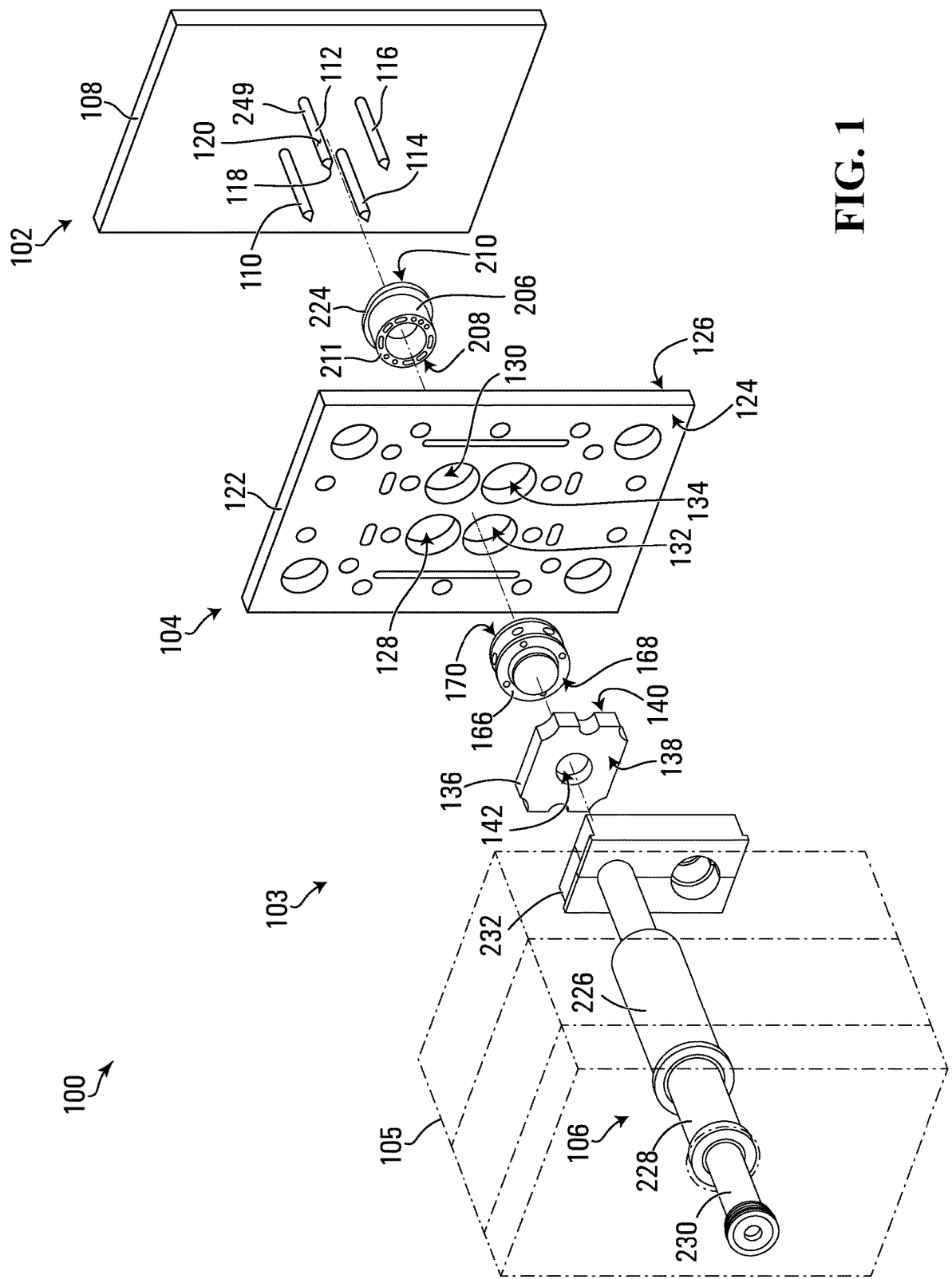
FIG. 1 is an exploded perspective view of an injection molding apparatus according to one embodiment.

Referring to FIG. 1, an injection molding apparatus according to one embodiment is shown generally at 100. The injection molding apparatus 100 includes a hot runner assembly illustrated schematically and shown generally at 102, and a mold shown generally at 103. The mold 103 includes a cavity plate assembly shown generally at 104, and a movable mold assembly 105 that includes a movable stack assembly shown generally at 106 and arranged in a mold shoe.

The hot runner assembly 102 includes a manifold plate 108 and injection nozzles 110, 112, 114, and 116. Although the embodiment shown includes four injection nozzles, alternative embodiments may include more or fewer injection nozzles. In general, each of the injection nozzles includes a nozzle tip (such as a nozzle tip 118 of the injection nozzle 112, for example) having at least one nozzle outlet (as described below with reference to FIGS. 14 and 15, for example), a fluid conduit extending through the injection nozzle and terminating at the at least one nozzle outlet (as also described below with reference to FIGS. 14 and 15, for example), and an outer sealing surface portion (such as a generally cylindrical outer sealing surface portion 120 of the injection nozzle 112, for example) surrounding a portion of the fluid conduit.

The cavity plate assembly 104 includes a cavity plate 122, which has a front side shown generally at 124 and a rear side shown generally at 126 and opposite the front side 124. The cavity plate 122 also defines gate openings shown generally at 128, 130, 132, and 134, each extending between, and open to, the front side 124 and the rear side 126. Further, the gate openings are aligned with respective nozzles such that when the rear side 126 of the cavity plate 122 is mounted against the manifold plate 108, the injection nozzle 110 is received in the gate opening 128, the injection nozzle 112 is received in the gate opening 130, the injection nozzle 114 is received in the gate opening 132, and the injection nozzle 116 is received in the gate opening 134. Again, although the embodiment shown includes four gate openings, alternative embodiments may include more or fewer gate openings.

Figure 2:
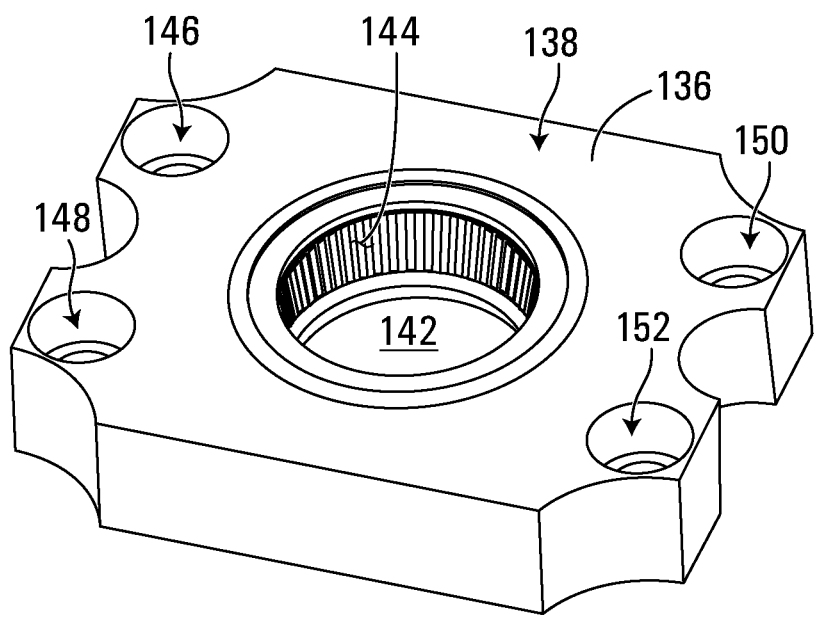
FIG. 2 is a front perspective view of a cavity flange of the injection molding apparatus of FIG. 1.
Figure 3:
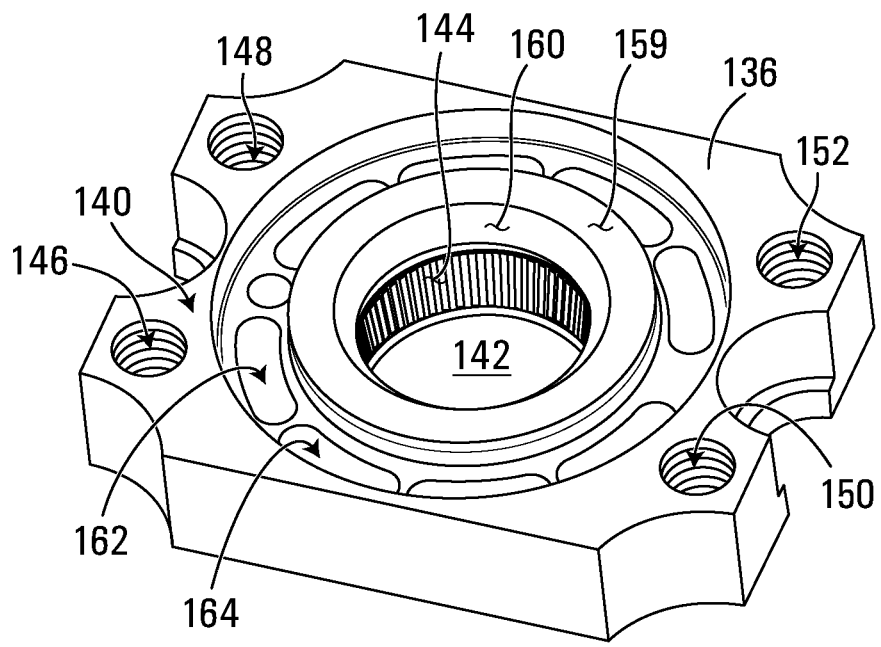
FIG. 3 is a rear perspective view of the cavity flange of FIG. 2.
Figure 4:
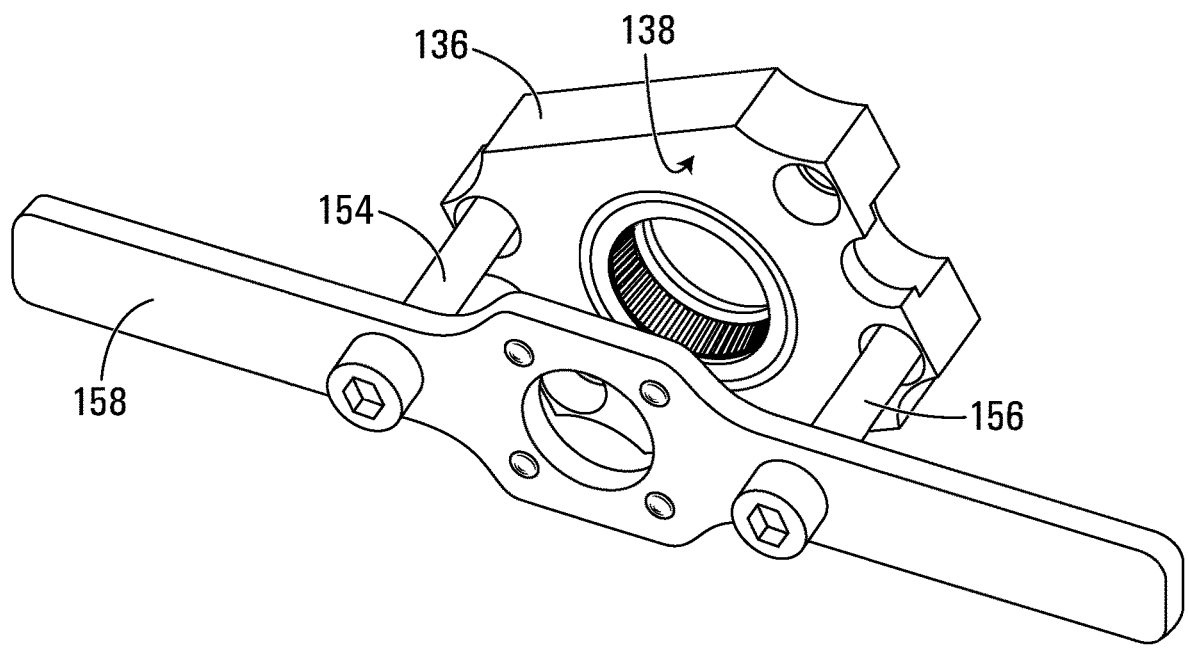
FIG. 4 is a front perspective view of the cavity flange of FIG. 2, also showing a tool that facilitates connecting and disconnecting the cavity flange.

The cavity plate assembly 104 also includes a molding body, which is a cavity flange 136 in the embodiment shown. The cavity flange 136 is a unitary structure that is made from a tool steel, although it may alternatively consist of a number of complementary parts and/or be made from other suitable materials known in the art. Referring to FIGS. 1-3, the cavity flange 136 has a front side shown generally at 138 and a rear side shown generally at 140 and opposite the front side 138. The cavity flange 136 also defines a portion of a molding cavity shown generally at 142 and extending between, and open to, the front side 138 and the rear side 140. More specifically, the cavity flange 136 defines a peripheral surface 144 of the portion of the molding cavity 142 that molds, in use, a peripheral outer surface (i.e. shell) of a closure for a container, as described below. The cavity flange 136 also defines threaded openings shown generally at 146, 148, 150, and 152 for receiving respective fasteners (not shown) to connect the cavity flange 136 to the front side 124 of the cavity plate 122. Further, referring to FIG. 4, the threaded openings may receive fasteners 154 and 156 to connect the cavity flange 136 to a tool 158 to facilitate connecting the cavity flange 136 to, and disconnecting the cavity flange 136 from, the front side 124 of the cavity plate 122 (shown in FIG. 1).

Referring back to FIG. 3, on the rear side 140, the cavity flange 136 includes a generally annular abutment surface 159 including a tapered alignment surface 160, the abutment surface 159 also surrounding a portion of the molding cavity 142. The tapered alignment surface 160 may facilitate alignment of the cavity flange 136 while connecting the cavity flange 136 to the front side 124 of the cavity plate 122 (shown in FIG. 1) as described below. Still referring to FIG. 3, on the rear side 140, the cavity flange 136 also defines cooling spaces (such as cooling spaces shown at 162 and 164 for example).

Referring back to FIG. 1, the cavity plate assembly 104 also includes a first injection gate body, which is a gate insert 166 in the embodiment shown. The gate insert 166 is a unitary structure that is made from a tool steel, although it may alternatively consist of a number of complementary parts and/or be made from other suitable materials known in the art. In the embodiment shown, the cavity flange 136 and the gate insert 166 are separate unitarily formed injection gate bodies, but in alternative embodiments the cavity flange 136 and the gate insert 166 may be a single unitarily formed injection gate body.

Figure 5:
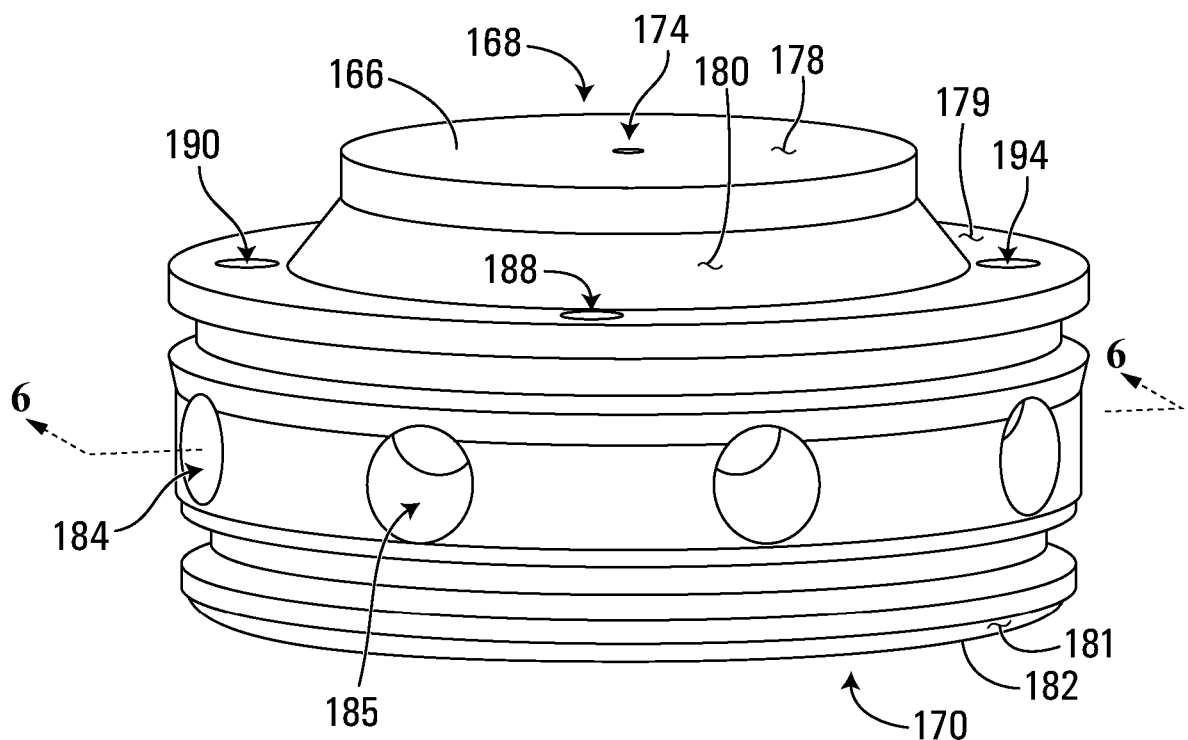
FIG. 5 is a perspective view of a gate insert of the injection molding apparatus of FIG. 1.
Figure 6:
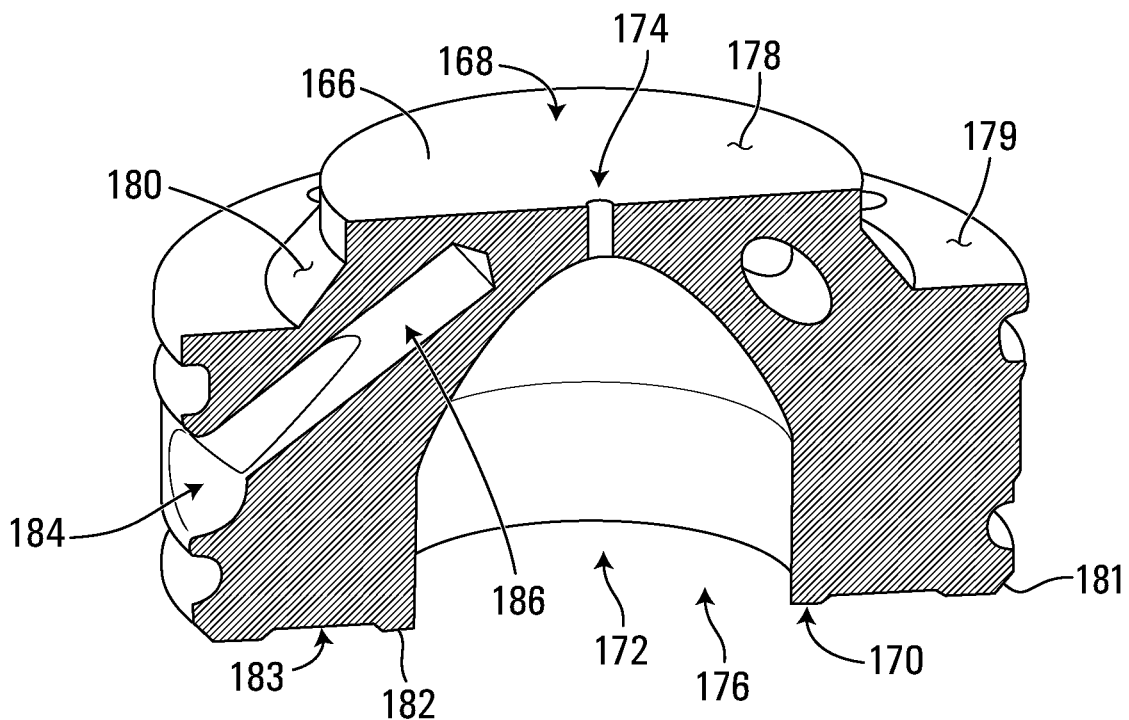
FIG. 6 is a cross-sectional view of the gate insert of FIG. 5, taken along the line 6-6 in FIG. 5.

Referring to FIGS. 1, 5, and 6, the gate insert 166 has a front side shown generally at 168 and a rear side shown generally at 170 and opposite the front side 168. The gate insert 166 defines an aperture shown generally at 172. The aperture 172 extends through the gate insert 166 between an injection gate outlet, shown generally at 174 on the first side 168, and an opening shown generally at 176 on the rear side 170 of the gate insert 166. The aperture 172 is also sized to receive the nozzle tip 118 (shown in FIG. 1), as described below, such that melted plastic forced out of the fluid conduit of the injection nozzle 112 (also shown in FIG. 1) through the injection nozzle outlet at the nozzle tip 118 may be forced through the injection gate outlet 174 and out the front side 168 of the gate insert 166.

On the front side 168, the gate insert 166 includes a molding surface 178 adjacent the injection gate outlet 174. The molding surface 178 defines a generally circular outer top surface of a closure for a container as described below. Also on the front side 168, the gate insert 166 includes a generally annular abutment surface 179 including a tapered alignment surface 180. The abutment surface 179 is complementary to the abutment surface 159 (shown in FIG. 3), and more particularly the tapered alignment surface 180 is complementary to the tapered alignment surface 160 (also shown in FIG. 3) to facilitate aligning the cavity flange 136 to the gate insert 166 as described below.

On the rear side 170, the gate insert 166 also includes a tapered alignment surface 181 and a generally annular abutment surface 182 surrounding the opening 176 to the aperture 172. The abutment surface 182 is generally planar, except that a recess shown generally at 183 in the abutment surface 182 defines a thermal insulation space as described below.

The gate insert 166 also defines cooling fluid openings (such as cooling fluid openings shown generally at 184 and 185, for example), and fluid conduits open to respective cooling fluid openings (such as a cooling fluid conduit 186 open to the cooling fluid opening 184, for example) that direct cooling fluid to adjacent cooling fluid openings. For example, cooling fluid received in the gate insert 166 at the cooling fluid opening 185 may travel through the cooling fluid conduit 186 and then exit the gate insert 166 at the cooling fluid opening 184.

Figure 7:
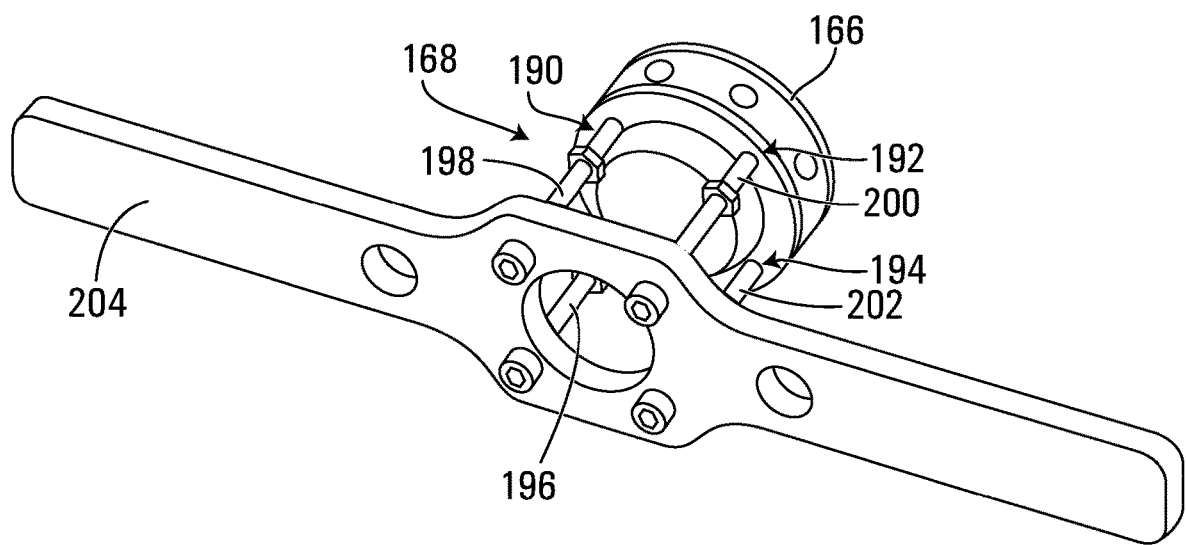
FIG. 7 is another perspective view of the gate insert of FIG. 5, also showing a tool that facilitates connecting and disconnecting the gate insert of FIG. 5.

Referring to FIGS. 5 and 7, on the front side 168, the gate insert 166 also defines threaded openings shown generally at 188, 190, 192, and 194 for receiving threaded fasteners 196, 198, 200, and 202 respectively to connect the gate insert 166 to a tool 204 to facilitate inserting the gate insert 166 in, and removing the gate insert 166 from, the gate opening 130 (shown in FIG. 1) in the cavity plate 122 or gate pad as described below.

Figure 8:
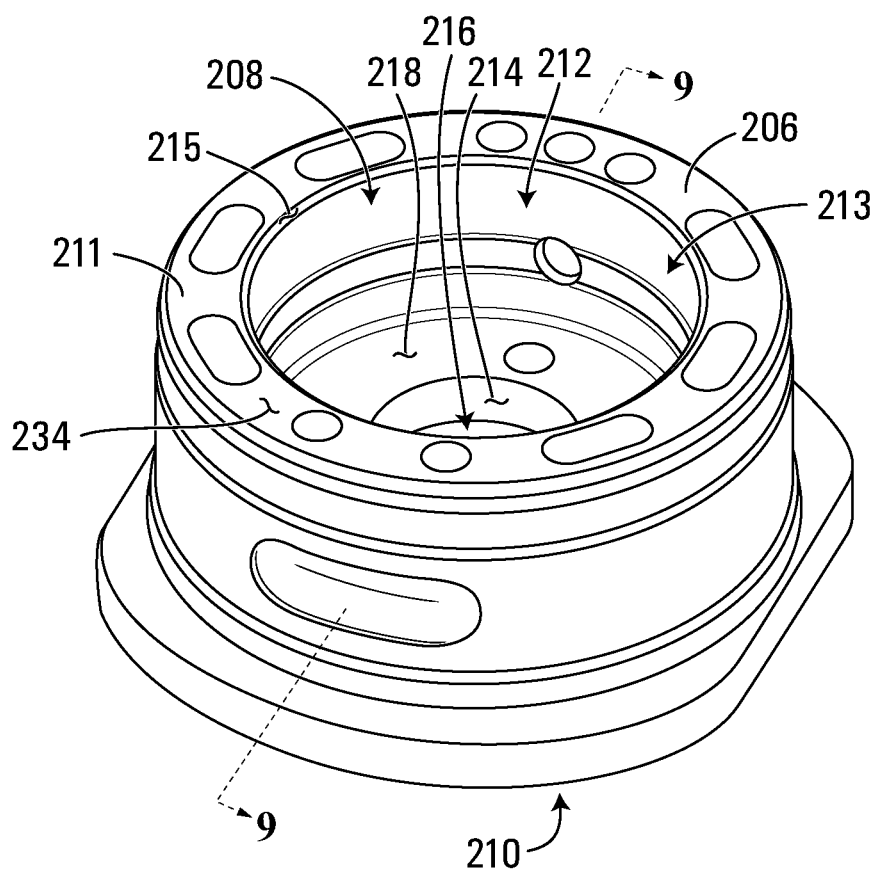
FIG. 8 is a perspective view of a gate pad of the injection molding apparatus of FIG. 1.
Figure 9:
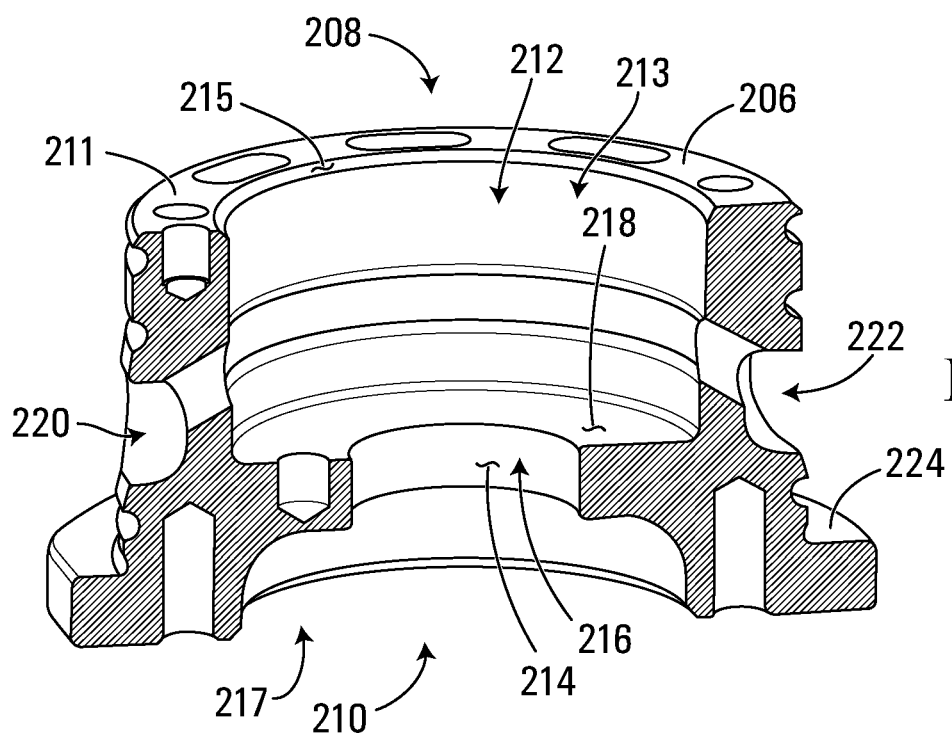
FIG. 9 is a cross-sectional view of the gate pad of FIG. 8, taken along the line 9-9 in FIG. 8.

Referring back to FIG. 1, the cavity plate assembly 104 also includes a second injection gate body, which is a gate pad 206 in the embodiment shown. The gate pad 206 is a unitary structure that is made from a tool steel, although it may alternatively consist of a number of complementary parts and/or be made from other suitable materials known in the art. Referring to FIGS. 8 and 9, the gate pad 206 has a front side shown generally at 208, and a rear side shown generally at 210 and opposite the front side 208. The gate pad 206 defines an aperture shown generally at 216. The aperture 216 extends through the gate pad 206 between an opening 213 on the front side 208 of the gate pad 206 and an opening shown generally at 217 on the rear side 210 of the gate pad 206. The gate pad 206 includes a generally cylindrical wall 211 that defines a recess shown generally at 212 in the aperture 216 and sized to receive at least a portion of the gate insert 166 from the opening 213 on the front side 208 of the gate pad 206 as described below. On the front side 208, the gate pad 206 includes a tapered alignment surface 215 that cooperates with the tapered alignment surface 181 (shown in FIGS. 5 and 6) to facilitate aligning the gate insert 166 to the gate pad 206 as described below.

The gate pad 206 also includes a generally cylindrical inner sealing surface 214 surrounding a portion of the aperture 216. The inner sealing surface 214 is complementary to the outer sealing surface portion 120 (shown in FIG. 1) of the injection nozzle 112 such that a portion of the injection nozzle 112 may be received in the aperture 216 with the outer sealing surface portion 120 of the injection nozzle 112 in close contact with the inner sealing surface 214 of the gate pad 206 to form a seal between the outer sealing surface portion 120 and the inner sealing surface 214.

The gate pad 206 includes a generally annular abutment surface 218 in the recess 212 and surrounding the aperture 216 on the front side 208 of the gate pad 206. The abutment surface 218 is positioned to abut the abutment surface 182 of the gate insert 166 when the gate insert 166 is received in the recess 212. The gate pad 206 also defines cooling fluid openings shown generally at 220 and 222, and when the gate insert 166 is received in the recess 212 with the abutment surface 182 of the gate insert 166 abutted against the abutment surface 218 of the gate pad 206, the cooling fluid openings 220 and 222 are positioned to direct fluid in or out of cooling fluid openings (such as the cooling fluid openings 184 and 185 shown in FIG. 5, for example) of the gate insert 166. Also, on the rear side 210, the gate pad 206 includes a flange 224 positionable against the rear side 126 (shown in FIG. 1) of the cavity plate 122 when the generally cylindrical wall 211 of the gate pad 206 is received in the gate opening 130 (also shown in FIG. 1) of the cavity plate 122.

Referring back to FIG. 1, the movable stack assembly 106 includes a stripper sleeve 226, an outer core 228, an inner core 230, and a slide 232. The outer core 228, the inner core 230, and the slide 232 also include molding surfaces that define surfaces of a closure for a container, as described below.

Figure 10:
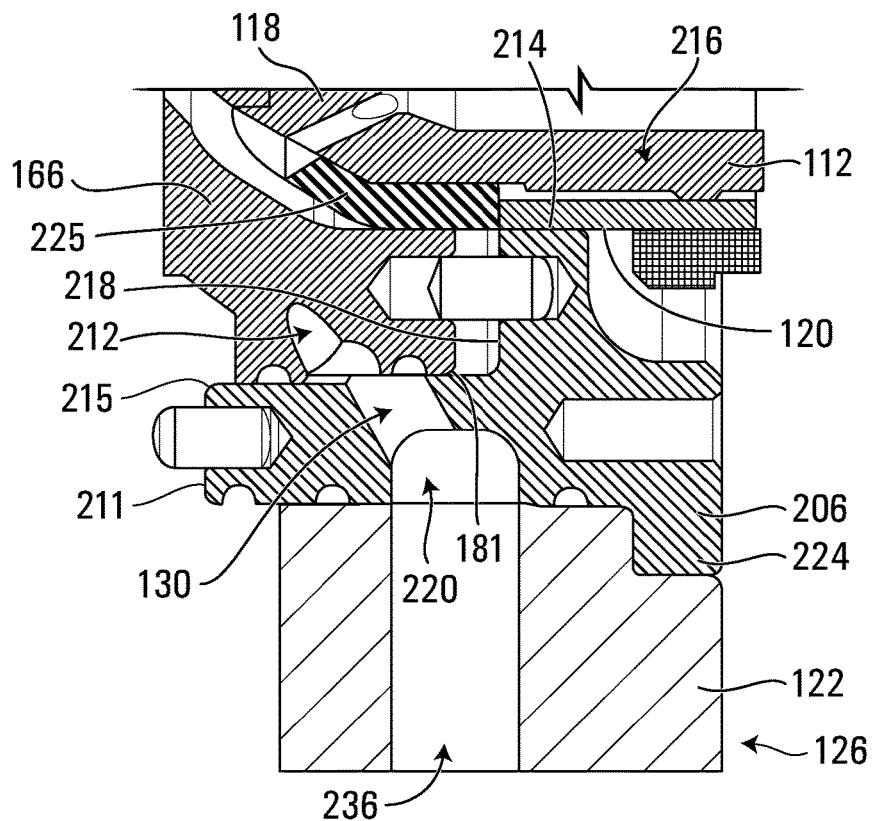
FIGS. 10-12 are cross-sectional views of the injection molding apparatus of FIG. 1 partially assembled.

Referring to FIG. 10, the injection molding apparatus 100 may be assembled by inserting the gate pad 206 into the cavity plate 122 such that the generally cylindrical wall 211 is received in the gate opening 130 and the flange 224 is positioned in a recess of the cavity plate 122 on the rear side 126 of the cavity plate 122, and the recess 212 of the gate pad 206 is open towards the front side 124 of the cavity plate 122. Then, a portion of the injection nozzle 112 may be inserted through the aperture 216 such that the outer sealing surface portion 120 of the injection nozzle 112 contacts, and forms a seal with, with the inner sealing surface 214, and such that the nozzle tip 118 extends into the recess 212. A vespel insulator 225 may be positioned around the nozzle tip 118 to insulate the space between the nozzle tip 118 and the aperture 172 with the gate insert 166 positioned in the recess 212. As shown with reference to FIG. 7, the tool 204 may be employed to insert the gate insert 166 from the front side 208 of the gate pad 206 and from the front side 124 of the cavity plate 122.

Still referring to FIG. 10, if the gate insert 166 is not aligned with the recess 212 as the gate insert 166 is positioned in the recess 212, then the tapered alignment surface 181 on the gate insert 166 may contact the tapered alignment surface 215 on the gate pad 206 to facilitate aligning the gate insert 166 with the recess 212. The tapered alignment surfaces 181 and 215 are spaced apart from surfaces that define the molding cavity, so any damage to the tapered alignment surfaces 181 and 215 that may be caused by contact between the tapered alignment surfaces 181 and 215 may be spaced apart from surfaces that define the molding cavity.

Figure 11:
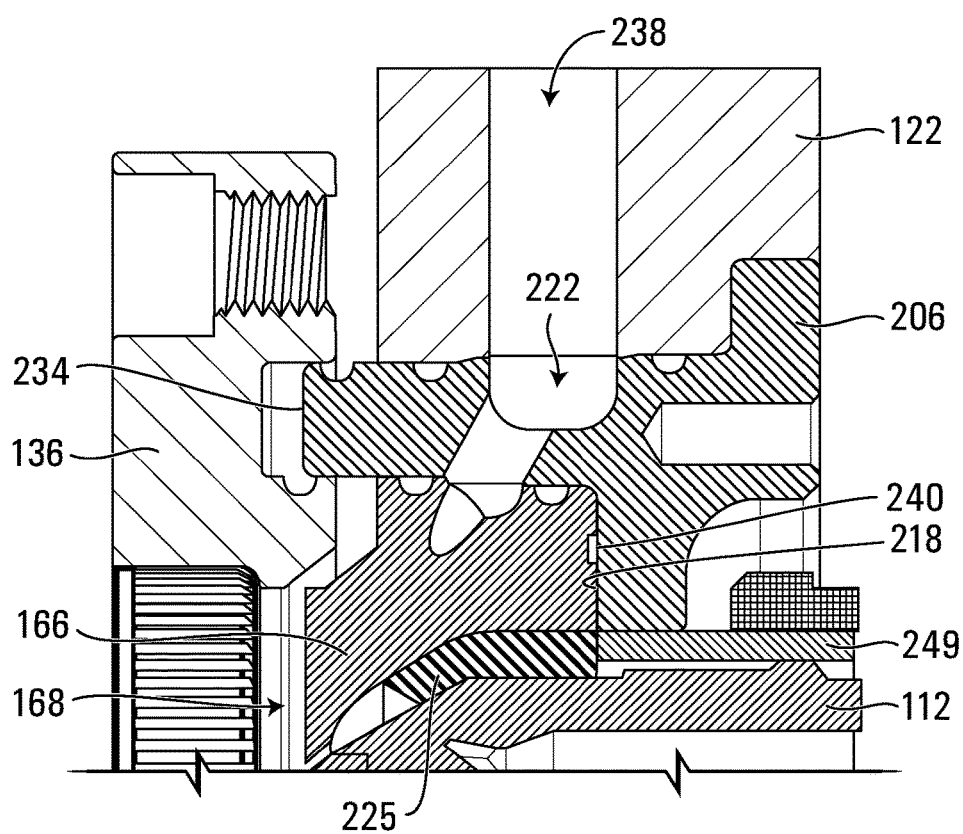

When the gate insert 166 is positioned in the recess 212, the abutment surface 182 of the gate insert 166 abuts the abutment surface 218 of the gate pad 206, as shown in FIG. 11. Further, as shown in FIG. 11, when the gate insert 166 is positioned in the recess 212 with the abutment surface 182 abutting the abutment surface 218, the inner sealing surface 214 of the gate pad 206 extends to an adjacent surface (the abutment surface 182 in the embodiment shown) of the gate insert 166, and the molding surface 178 of the gate insert 166 is substantially coplanar with a front surface 234 of the gate pad 206. In this context, "substantially coplanar" refers to surfaces that may not be perfectly coplanar, but that may function substantially similar to coplanar surfaces.

Further, as shown in FIGS. 10 and 11, the cavity plate 122 includes cooling fluid channels, such as cooling fluid channels shown generally at 236 and 238 for example, and as shown in FIG. 11, when the gate insert 166 is positioned in the recess 212 with the abutment surface 182 of the gate insert 166 abutting the abutment surface 218 of the gate pad 206, the cooling fluid channels 236 and 238 are aligned with the cooling fluid openings 220 and 222 respectively. Further, as shown in FIG. 11, when the abutment surface 182 of the gate insert 166 abuts the abutment surface 218 of the gate pad 206, the recess 183 in the abutment surface 182 defines a thermal insulation space shown generally at 240. Although the thermal insulation space 240 in the embodiment shown is formed by the recess 183 in the gate insert 166, one or more thermal insulation spaces in alternative embodiments may be formed by one or more surfaces of at least one of the gate insert 166 and the gate pad 206.

Figure 12:
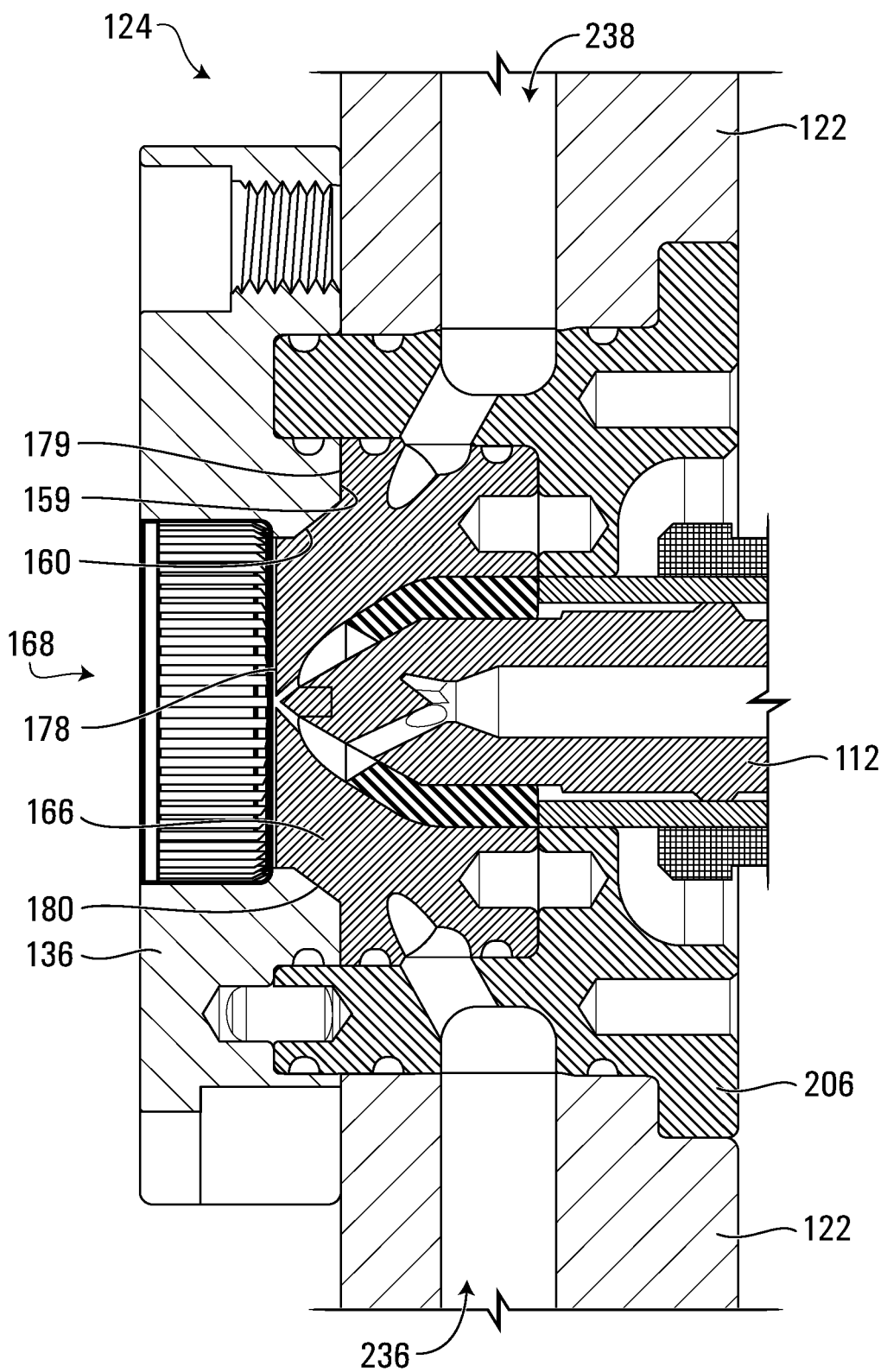

Referring to FIGS. 11 and 12, the cavity flange 136 may be positioned on the front side of the gate insert 166, using the tool 158 (shown in FIG. 4) for example. If the cavity flange 136 is not aligned with the gate insert 166 as the cavity flange 136 is positioned on the front side 168 of the gate insert 166, then the tapered alignment surface 160 of the cavity flange 136 may contact the tapered alignment surface 180 on the gate insert 166 to facilitate aligning the cavity flange 136 with the gate insert 166. The tapered alignment surfaces 160 and 180 are spaced apart from surfaces that define the molding cavity, so any damage to the tapered alignment surfaces 160 and 180 that may be caused by contact between the tapered alignment surfaces 160 and 180 may be spaced apart from surfaces that define the molding cavity.

Figure 13:
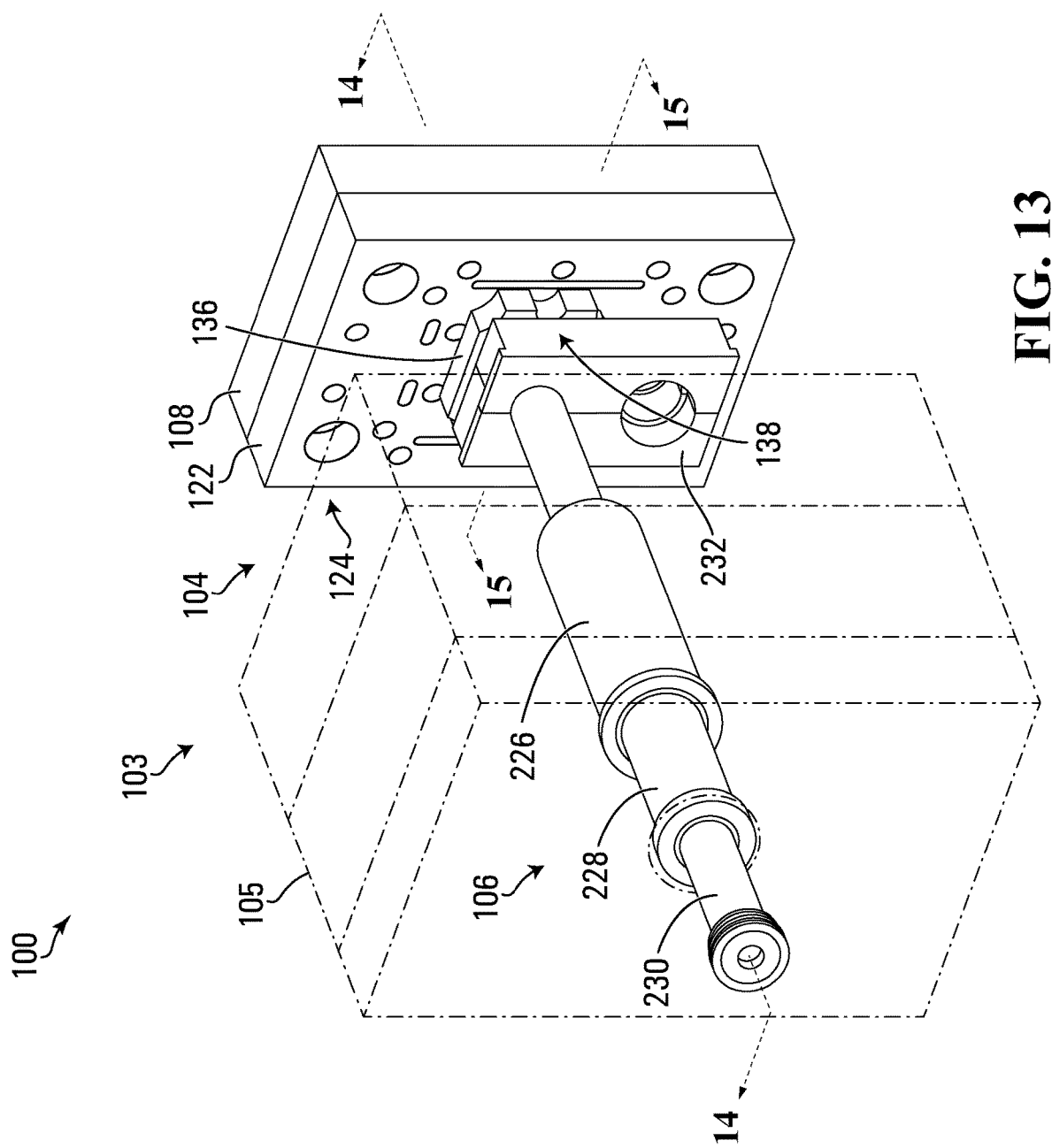
FIG. 13 is a perspective view of the injection molding apparatus of FIG. 1 assembled.
Figure 14:
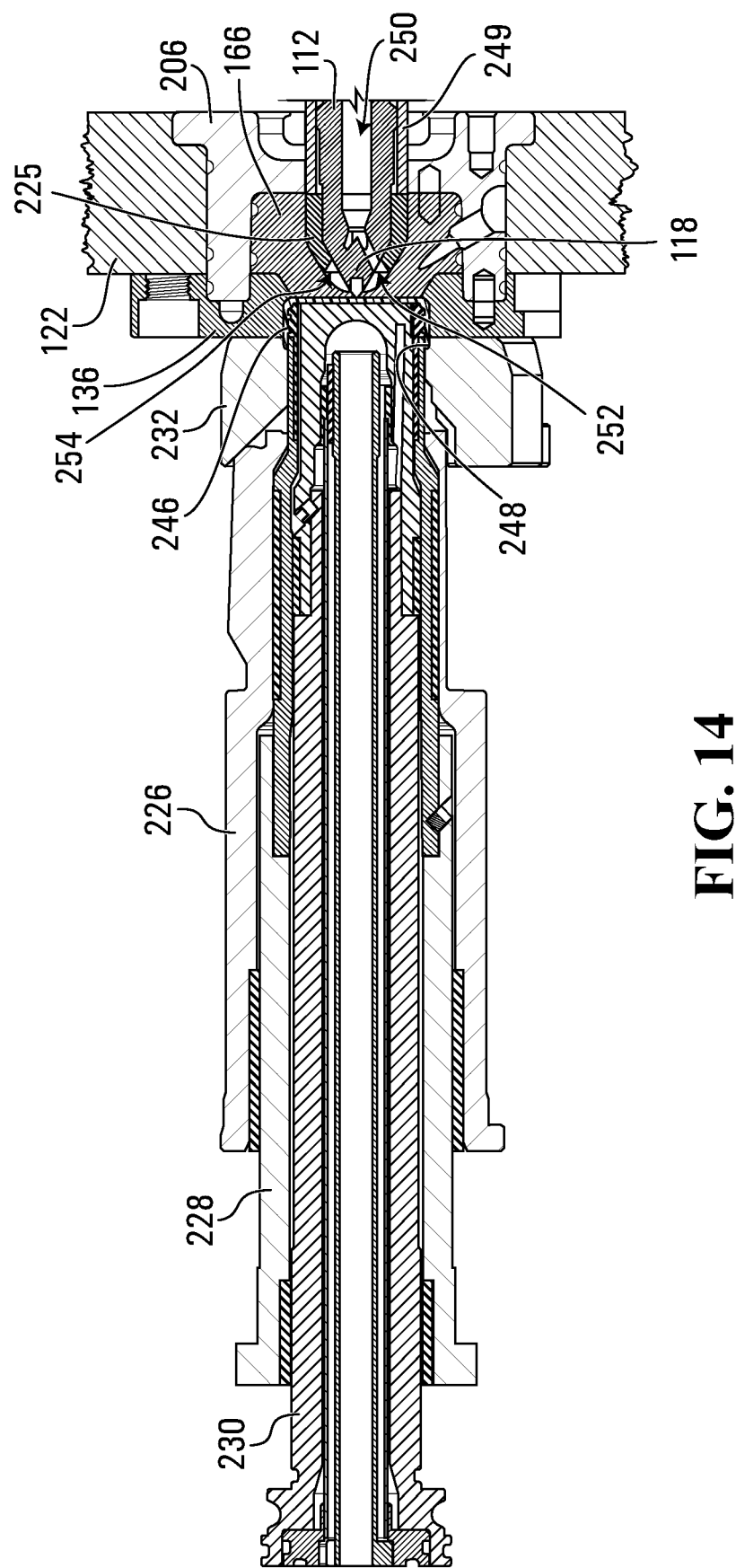
FIG. 14 is a cross-sectional view of the injection molding apparatus of FIG. 1 assembled as shown in FIG. 13, taken along the line 14-14 in FIG. 13.
Figure 15:
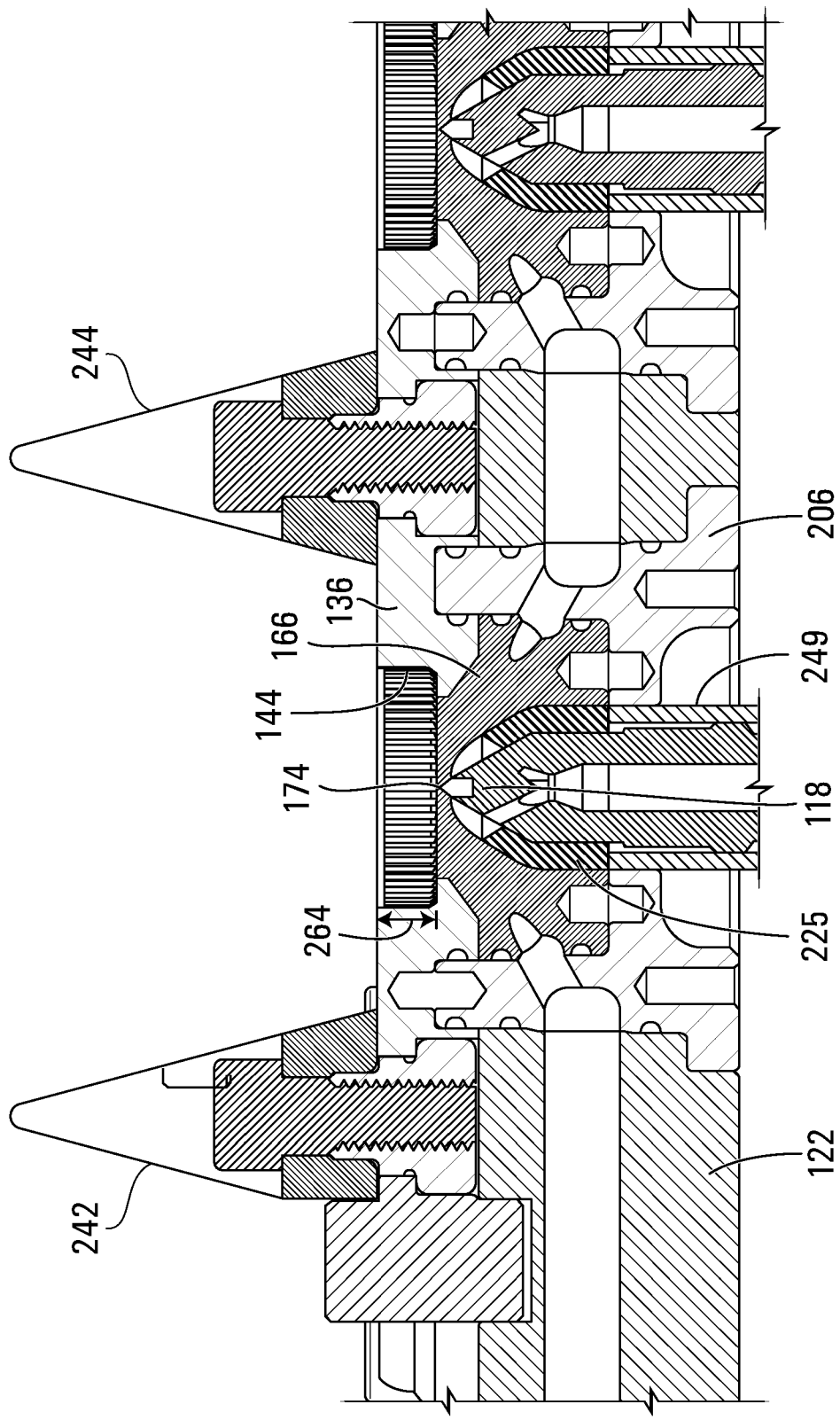
FIG. 15 is a cross-sectional view of the injection molding apparatus of FIG. 1 assembled as shown in FIG. 13, taken along the line 15-15 in FIG. 13.

The cavity flange 136 may be connected to the front side 124 of the cavity plate 122, and thus to the front side 168 of the gate insert 166, using fasteners (not shown) through the threaded openings 146, 148, 150, and 152 (shown in FIGS. 2 and 3), and using additional retainers 242 and 244 (shown in FIGS. 13-15). More generally, the cavity flange 136 is connectable to, and disconnectable from, the cavity plate 122 from the front side 124 of the cavity plate 122 and the gate insert 166 from the front side 168 of the gate insert 166 without requiring separating the cavity plate 122 from the manifold plate 108 of the hot runner assembly 102 (for example by "latching over" the cavity plate 122 to the shoe (not shown) that retains the movable stack assembly 106), and more generally without requiring removal of any components of the injection molding apparatus 100. In other words, the injection molding apparatus 100 is free from any structure that would prevent the cavity flange 136 from being connectable to, or disconnectable from, the cavity plate 122 from the front side 124 of the cavity plate 122 and the gate insert 166 from the front side 168 of the gate insert 166.

Further, as shown in FIG. 12, when the cavity flange 136 is positioned on the front side of the gate insert 166, the abutment surface 159 on the cavity flange 136 abuts the abutment surface 179 on the gate insert 166. Therefore, when the cavity flange 136 is connected (in a connected position shown in FIG. 12) to the front side 124 of the cavity plate 122, the cavity flange 136 retains the gate insert 166 within the gate pad 206. More generally, the gate insert 166 is connectable to, and disconnectable from, the cavity plate 122 from the front side 124 of the cavity plate 122 and the front side 208 of the gate pad 206 without requiring separating the cavity plate 122 from the manifold plate 108 of the hot runner assembly 102 (for example by "latching over" the cavity plate 122 to the shoe (not shown) that retains the movable stack assembly 106), and more generally without requiring removal of any components (other than the cavity flange 136) from the injection molding apparatus 100. In the embodiment shown, the gate insert 166 is connectable to the gate pad 206 from the front side 208 of the gate pad 206 when at least a portion of the gate insert 166 is received in the recess 212 of the gate pad 206. Further, the gate insert 166 is connectable to, and disconnectable from, the cavity plate 122 from the front side 124 of the cavity plate 122 and the front side 208 of the gate pad 206 without requiring removal of any components (other than the cavity flange 136) from the injection molding apparatus 100. In other words, when the cavity flange 136 is disconnected from the front side 124 of the cavity plate 122 and the front side 168 of the gate insert 166, the injection molding apparatus 100 is free from any structure that would prevent the gate insert 166 from being connectable to, or disconnectable from, the cavity plate 122 from the front side 124 of the cavity plate 122 and the gate pad 206 from the front side 208 of the gate pad 206.

Referring to FIG. 13, once the injection molding apparatus 100 is assembled as shown in FIGS. 10-12 and with closing of the mold 103, the peripheral surface 144 of the cavity flange 136, the molding surface 178 of the gate insert 166, and a molding surface 248 of the slide 232 collectively define an outer surface of a closure for a container, and a molding surface 246 defined on the inner core 230 and the outer core 228 defines inner surfaces of the closure. Therefore, when the cavity flange 136 is connected (in the connected position shown in FIG. 12) to the front side 124 of the cavity plate 122, the cavity flange 136 defines a portion of a molding cavity (shaped to mold an outer surface of a shell of a closure for a container in the embodiment shown), and the molding surface 178 of the gate insert 166 also defines a portion of such a molding cavity (shaped to mold a top surface of a top panel of a closure for a container in the embodiment shown).

Referring to FIGS. 14 and 15, the injection nozzle 112 is shown in greater detail and includes a nozzle housing 249 and a fluid conduit shown generally at 250. The fluid conduit 250 extends through the injection nozzle 112 and terminates at nozzle outlets shown generally at 252 and 254 (or, more generally, at least one nozzle outlet) in the nozzle tip 118. The outer sealing surface portion 120 is on the nozzle housing 249, surrounds a portion of the fluid conduit 250, and contacts the inner sealing surface 214 of the gate pad 206 when a portion of the injection nozzle having the outer sealing surface portion 120 is received in the aperture 216. The nozzle tip 118 extends forward (namely in a direction towards the front sides 124, 138, and 168) of the outer sealing surface portion 120 and may be connectable to and disconnectable from the nozzle housing 249.

As shown in FIGS. 14 and 15, when the gate insert 166 is received in the gate pad 206, the aperture 172 of the gate insert 166 accommodates at least a front portion of the nozzle tip 118 therein with the nozzle outlets 252 and 254 positioned to inject fluid (not shown) through the injection gate outlet 174. Further, the injection nozzle 112 does not contact the gate insert 166 (except indirectly through the vespel insulator 225) and the injection nozzle 112 is spaced apart from the gate insert 166.

As indicated above, the molding surface 178 of the gate insert 166 defines a generally circular outer top surface (i.e. top panel) of a closure for a container, and the outer top surface of such a closure may include text, logos, or other shapes or images defined by the molding surface 178. Therefore, such text, logos, or other shapes or images on the outer top surface of such a closure may be changed by substituting a different gate insert for the gate insert 166, and because the gate insert 166 is connectable to, and disconnectable from, the cavity plate 122 and the gate pad 206 without requiring separating the cavity plate 122 from the hot runner assembly 102 and without requiring removal of any components (other than the cavity flange 136) from the injection molding apparatus 100 as indicated above, such text, logos, or other shapes or images on the outer top surface of such a closure may be changed more easily or efficiently, or for lower cost, than in other injection molding apparatuses.

Figure 16:
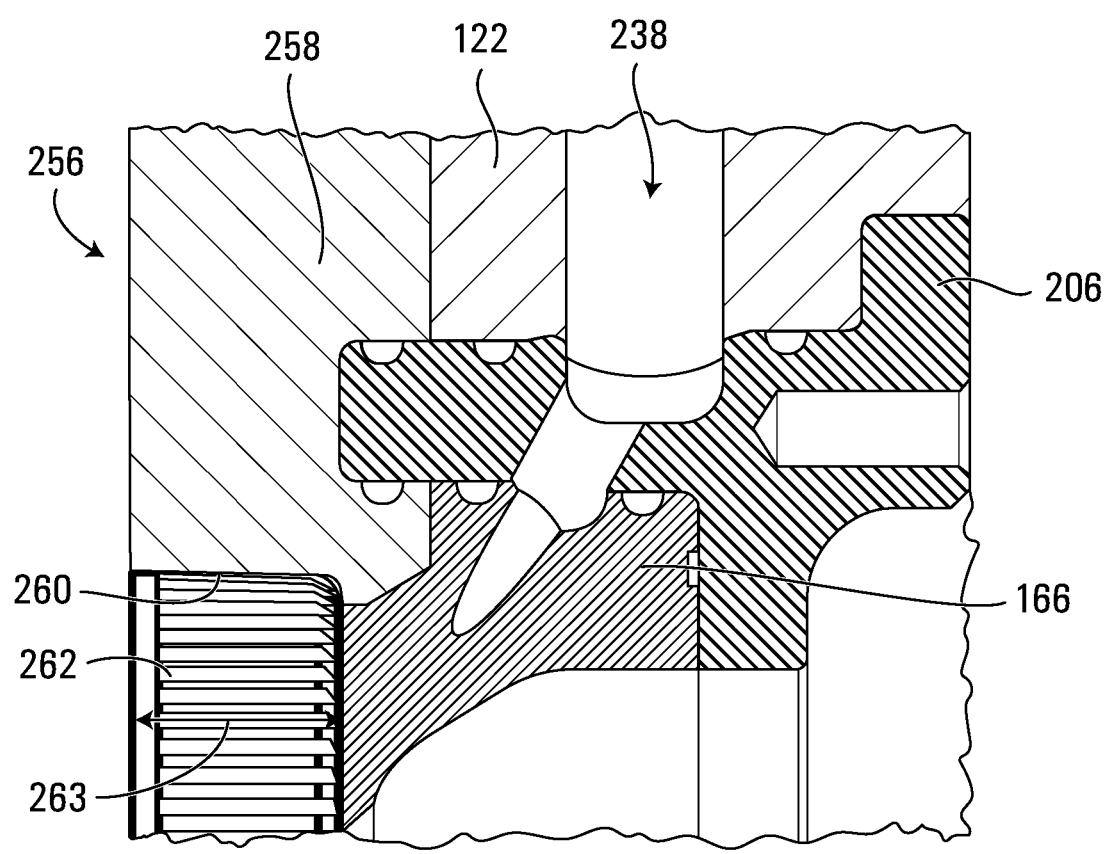
FIG. 16 is a cross-sectional view of an injection molding apparatus according to another embodiment including a cavity flange different from the cavity flange of FIG. 2.

Further, other characteristics of such a closure may be changed more easily or efficiently, or for lower cost, than in other injection molding apparatuses. For example, referring to FIG. 16, an injection molding apparatus according to another embodiment is shown generally at 256 and includes the cavity plate 122, the gate insert 166, and the gate pad 206 assembled as described above, but includes a different molding body, which in the embodiment shown is a unitarily formed cavity flange 258. The cavity flange 258 includes a peripheral surface 260 that defines a portion of a molding cavity shown generally at 262 that molds, in use, a peripheral outer surface (i.e. shell) of the closure, and the cavity flange 258 is similar to the cavity flange 136 described above, but the peripheral surface 260 has a height 263 that differs from a height 264 (shown in FIG. 15) of the peripheral surface 144 of the cavity flange 136. Therefore, by replacing the cavity flange 136 with another cavity flange such as the cavity flange 258, the height (or other characteristics of the peripheral outer surface of a closure) may be changed more easily or efficiently, or for lower cost, than in other injection molding apparatuses.

Also, because the cavity flange 136 and the gate insert 166 are both connectable to, and disconnectable from, the cavity plate 122 and the gate pad 206 without requiring separating the cavity plate 122 from the hot runner assembly 102 and without requiring removal of any components (other than the cavity flange 136) from the injection molding apparatus 100 as indicated above, cleaning one or more of the cavity flange 136, the gate insert 166, and the recess 212, and servicing the portion of the injection nozzle 112 (such as the nozzle tip 118) that extends to the front side of the abutment surface 218, may be easier or more efficient, or may involve a lower cost, than in other injection molding apparatuses.

Further, as indicated above and shown in FIGS. 11-15, the outer sealing surface portion 120 (shown in FIG. 1) of the injection nozzle 112 forms a seal with the inner sealing surface 214 of the gate pad 206, which does not form any portion of the molding cavity, and the injection nozzle 112 does not form a seal with the gate insert 166, which does form a portion the molding cavity. Therefore, the outer sealing surface portion 120 (shown in FIG. 1) of the injection nozzle 112 forms a seal with an injection gate body different from an injection gate body that forms a portion the molding cavity, which may reduce transmission of heat from the heated injection nozzle 112 to the cooled molding cavity, and which may thus reduce waste of heat and conserve energy. In the embodiment shown, the thermal insulation space 240 may further reduce waste of heat and conserve energy.

Although specific embodiments have been described and illustrated, such embodiments should be considered illustrative only and not as limiting the invention as construed according to the accompanying claims.

What is claimed is:

1. An injection molding apparatus comprising:
   a first injection gate body having front and rear opposite sides and a first aperture extending through the first injection gate body between an injection gate outlet on the front side of the first injection gate body and an opening on the rear side of the first injection gate body; and
   a second injection gate body having front and rear opposite sides and a second aperture extending through the second injection gate body between an opening on the front side of the second injection gate body and an opening on the rear side of the second injection gate body, the second injection gate body comprising an inner sealing surface defining at least a portion of the second aperture and complementary to an outer sealing surface portion of an injection nozzle such that, when a portion of the injection nozzle is received in the second aperture, the outer sealing surface portion of the injection nozzle contacts the inner sealing surface of the second injection gate body to form a seal between the outer sealing surface portion of the injection nozzle and the inner sealing surface of the second injection gate body,
   wherein the first injection gate body is connectable to and disconnectable from the second injection gate body from the front side of the second injection gate body such that, when the rear side of the first injection gate body is connected in a connected position to the front side of the second injection gate body, the first aperture is adjacent the second aperture to permit the first aperture to receive at least a front portion of a nozzle tip of the injection nozzle with at least one nozzle outlet of the nozzle tip positioned to inject fluid through the injection gate outlet when the portion of the injection nozzle is received in the second aperture.

2. The apparatus of claim 1 further comprising a molding body connectable to and disconnectable from the first injection gate body from the front side of the first injection gate body wherein, when the molding body is connected in a connected position to the front side of the first injection gate body, the molding body defines at least a portion of a molding cavity.

3. The apparatus of claim 2 wherein, when the molding body is connected in the connected position to the front side of the first injection gate body, the molding body and a molding surface on the front side of the first injection gate body define at least a portion of the molding cavity.

4. The apparatus of claim 2 wherein the first injection gate body is a gate insert that defines a top panel of a closure for a container, and wherein the molding body is a cavity flange that defines a shell of the closure.

5. The apparatus of claim 4 wherein the second injection gate body is a gate pad that is configured to be received in a cavity plate of a cavity assembly.

6. The apparatus of claim 5 wherein the second injection gate body defines a recess sized to receive at least a portion of the first injection gate body, and wherein the gate insert is connectable to the gate pad from the front side of the gate pad when the at least a portion of the gate insert is inserted in the recess.

7. The apparatus of claim 1 wherein the second injection gate body defines a recess sized to receive at least a portion of the first injection gate body, and wherein the first injection gate body is connectable to the second injection gate body from the front side of the second injection gate body when the at least a portion of the first injection gate body is inserted in the recess.

8. The apparatus of claim 1 wherein the outer sealing surface portion of the injection nozzle and the inner sealing surface of the second injection gate body are generally cylindrical.

9. The apparatus of claim 1 wherein at least one of the first injection gate body and the second injection gate body defines at least one thermal insulation space between at least one surface of the first injection gate body and at least one surface of the second injection gate body that are adjacent when the first injection gate body is connected in the connected position to the front side of the second injection gate body.

10. The apparatus of claim 9 wherein:
    the first injection gate body defines a first abutment surface on the rear side of the first injection gate body and surrounding the opening on the rear side of the first injection gate body;
    the second injection gate body defines a second abutment surface on the front side of the second injection gate body and surrounding the opening on the front side of the second injection gate body; and
    when the first injection gate body is connected in the connected position to the front side of the second injection gate body, the first abutment surface abuts the second abutment surface to form a seal between the first abutment surface and the second abutment surface, and the thermal insulation space is defined between the first abutment surface and the second abutment surface.

11. The apparatus of claim 1 further comprising the injection nozzle, wherein the injection nozzle comprises a fluid conduit extending through the injection nozzle and terminating at the at least one nozzle outlet, and wherein the outer sealing surface portion surrounds a portion of the fluid conduit.

12. The apparatus of claim 11 wherein, when the portion of the injection nozzle is received in the second aperture, the injection nozzle is spaced apart from the first injection gate body.

13. A gate insert comprising:
    an injection gate body having front and rear opposite sides and an aperture extending through the injection gate body between an injection gate outlet on the front side of the injection gate body and an opening on the rear side of the injection gate body, wherein the injection gate body is connectable to and disconnectable from a gate pad in a cavity plate from a front side of the gate pad and from a front side of the cavity plate.

14. The gate insert of claim 13 wherein the injection gate body has a tapered alignment surface on the rear side of the injection gate body to facilitate aligning the injection gate body with the gate pad.

15. The gate insert of claim 13 wherein the injection gate body has a molding surface on the front side of the injection gate body that defines a top panel of a closure for a container.

16. A cavity flange comprising:
   a molding body defining at least a portion of a molding cavity shaped to mold a shell of a closure for a container,
   wherein the molding body is connectable to and disconnectable from a gate insert in a cavity plate from a front side of the gate insert and from a front side of the cavity plate.

17. The cavity flange of claim 16 wherein the molding body has a tapered alignment surface on the rear side of the molding body to facilitate aligning the molding body with the gate insert.

\* \* \* \* \*